United States Patent
Hauck

(10) Patent No.: US 6,961,807 B1
(45) Date of Patent: Nov. 1, 2005

(54) DEVICE, SYSTEM AND METHOD FOR AN INTEGRATED CIRCUIT ADAPTABLE FOR USE IN COMPUTING SYSTEMS OF DIFFERING MEMORY REQUIREMENTS

(75) Inventor: Lane Thomas Hauck, San Diego, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 196 days.

(21) Appl. No.: 10/229,432

(22) Filed: Aug. 27, 2002

(51) Int. Cl.[7] .............................................. G06F 12/00
(52) U.S. Cl. ...................... 711/103; 711/100; 711/149; 711/154
(58) Field of Search ............................... 711/100, 102, 711/103, 118, 131, 149, 154, 170; 710/36; 365/63

(56) References Cited

U.S. PATENT DOCUMENTS

| | | | |
|---|---|---|---|
| 3,918,031 A | | 11/1975 | Watson |
| 4,149,268 A | | 4/1979 | Waters |
| 4,361,869 A | | 11/1982 | Johnson et al. |
| 4,794,524 A | | 12/1988 | Carberry et al. |
| 4,995,004 A | | 2/1991 | Lee |
| 5,025,366 A | | 6/1991 | Baror |
| 5,046,180 A | | 9/1991 | Ueda et al. |
| 5,175,835 A | | 12/1992 | Beighe et al. |
| 5,410,718 A | | 4/1995 | Masumura et al. |
| 5,432,729 A | * | 7/1995 | Carson et al. ................. 365/63 |
| 5,473,758 A | | 12/1995 | Allen et al. |
| 5,623,686 A | | 4/1997 | Hall et al. |
| 5,627,992 A | | 5/1997 | Baror |
| 5,687,131 A | | 11/1997 | Spaderna |
| 5,822,243 A | | 10/1998 | Shone |
| 5,832,294 A | | 11/1998 | Reinschmidt |
| 5,860,021 A | | 1/1999 | Klingman |
| 5,903,908 A | * | 5/1999 | Singh et al. ................. 711/122 |
| 5,913,225 A | | 6/1999 | Ohba et al. |
| 5,938,783 A | | 8/1999 | Whetsel |
| 5,948,106 A | * | 9/1999 | Hetherington et al. ....... 713/501 |
| 5,959,887 A | | 9/1999 | Takahina et al. |
| 5,966,726 A | | 10/1999 | Sokolov |
| 5,974,508 A | | 10/1999 | Maheshwari |
| 5,983,023 A | | 11/1999 | Moriwaki et al. |
| 5,987,536 A | * | 11/1999 | Johnson et al. ................ 710/36 |
| 6,044,412 A | | 3/2000 | Evoy |
| 6,067,633 A | * | 5/2000 | Robbins et al. ................ 714/1 |
| 6,069,897 A | | 5/2000 | Perlman et al. |
| 6,081,473 A | | 6/2000 | Agrawal et al. |

(Continued)

FOREIGN PATENT DOCUMENTS

JP        401296499 A     11/1989

OTHER PUBLICATIONS

IBM Technical Disclosure Bulletin; vol. 28; Issue No. 1; pp. 20–23; Jun. 1, 1985; Cross Reference: 0018-8689-28-1-20.*

(Continued)

*Primary Examiner*—Tuan V. Thai
(74) *Attorney, Agent, or Firm*—Dorsey & Whitney LLP

(57) ABSTRACT

An integrated circuit device, and associated system and method, including a microprocessor, a multipurpose memory coupled with the microprocessor, a cache controller, and a first and second memory port. In one example, the first memory port is provided for coupling a first external memory device with the cache controller, and the second memory port is provided for coupling a second external memory device with the multipurpose memory. In one example, the first memory port may be adapted to be coupled with a Flash ROM, and the second memory port may be adapted to be coupled with an EEPROM. In this manner, the integrated circuit device may be utilized in different systems that have differing memory requirements.

17 Claims, 5 Drawing Sheets

MODE 2

U.S. PATENT DOCUMENTS

| | | | |
|---|---|---|---|
| 6,108,765 | A | 8/2000 | Caudel et al. |
| 6,122,216 | A | 9/2000 | Dykes |
| 6,148,347 | A | 11/2000 | Finch et al. |
| 6,178,517 | B1 | 1/2001 | Bertin et al. |
| 6,202,125 | B1 * | 3/2001 | Patterson et al. .......... 711/118 |
| 6,247,084 | B1 * | 6/2001 | Apostol et al. ............ 710/108 |
| 6,263,400 | B1 | 7/2001 | Rangasayee et al. |
| 6,282,643 | B1 * | 8/2001 | Cromer et al. ................. 713/2 |
| 6,711,666 | B1 * | 3/2004 | Feldman ...................... 712/32 |
| 2003/0056061 | A1 * | 3/2003 | Sherman ..................... 711/131 |

OTHER PUBLICATIONS

Conference Paper, "PM/sup 4/, Purdue multimode multimicroprocessor system–a reconfigurable multiprocessor system for pattern recognition and image processing"; Jun. 4–7, 1979; authors F. A. Brigs, King–Sun Fu; Kai Hwang, J. H. Patel; AFIPS Conference Proceedings, vol. 48, 1979 National Computer Conference.

Conference Paper, "MC68030: the second generation 32–bit microprocessor"; Jun. 15–18, 1987; author M. Ruhlandl; AFIPS Conference Proceedings, vol. 56, 1987 National Computer Conference.

Journal Paper, "Cache memory for systems with 32 bit micros"; Dec. 1987; author V. Siva Kumar; source Ellettronica Oggi, No. 52, pp. 91–2, 94, 97–8; INSPEC Abstract No. C88029425.

Conference Paper, The emergence of microprocessor memory packaging standardization; May 13–15, 1980; author J. Lundy; Electro/80 Conference Record, p. 894.

Journal Paper, "Circuit engineering of single–mode and multimode pulse distributors based on static–dynamic triggers"; Jun. 1991; Telecommunications and Radio Engineering, Part 2 (Radio Engineering), vol. 46, No. 6, pp. 122–125; authors V. Sh. Arutyunyan; A. A. Kostandyan; A. Z. Muradyan.

Conference Paper, "An SRAM–programmable field–configurable memory"; May 1–4, 1995; Proceedings of the IEEE 1995 Custom Integrated Circuits Conference; authors T. Ngai; J. Rose, S.J.E. Wilton.

Journal Article; "Neuroprocessor NeuroMatrix NM6403 architecture overview"; 1999; Proceedings of SPIE–The International Society for Optical Engineering v 3728 1999, pp. 253–264; authors P. A. Chevtchenko; D. V. Fomine; V. M. Tchernikov; P. E. Vixne.

"Multichip Module with Two Memory Configurations", 3 pages; Feb. 1994; IBM Technical Disclosure Bulletin, pp. 129–130.

* cited by examiner

MODE 1

MODE 1

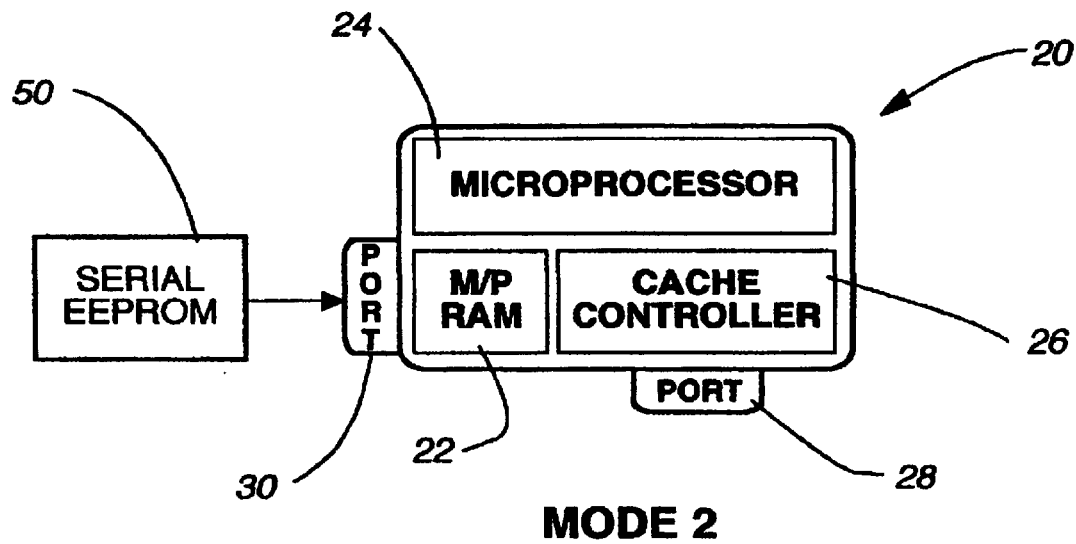
MODE 2
Fig. 4A (BOOT)
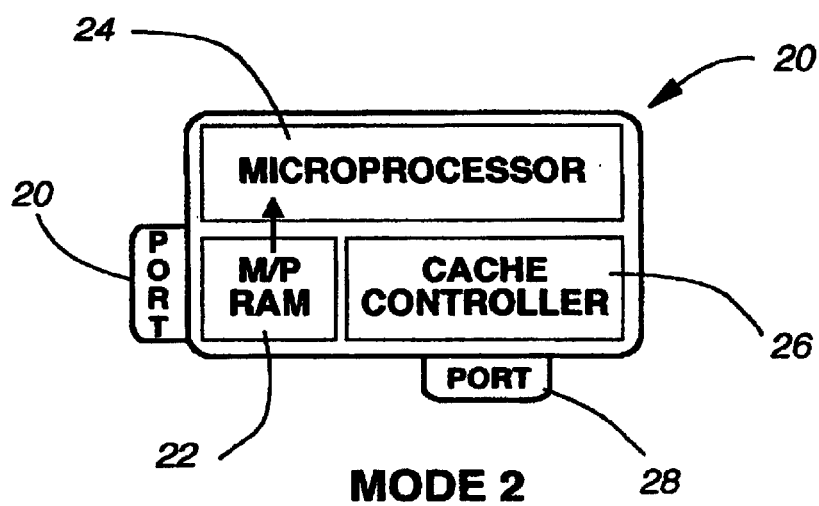
MODE 2
Fig. 4B (RUN)

DEVICE, SYSTEM AND METHOD FOR AN INTEGRATED CIRCUIT ADAPTABLE FOR USE IN COMPUTING SYSTEMS OF DIFFERING MEMORY REQUIREMENTS

TECHNICAL FIELD

This application relates, in general, to integrated circuits and associated memory systems.

BACKGROUND

Computer chips, such as microprocessors or microcontrollers, are made of a die and a package. The die has an integrated circuit thereon which may include various circuits such as the microprocessor, memory, power circuits, logic circuit, interface circuits, etc. From the die, signal lines are connected to signal lines of the package. The package has pins or other conductors extending from the package which are used to connect the signal lines of the package to other circuits on a printed circuit board.

In the design of an integrated circuit incorporating a microprocessor, microcontroller, or other logic, it is often difficult to determine the appropriate amount of on-chip memory to incorporate on the die in order to suit the many applications that the integrated circuit may serve. For instance, a large amount of on-chip static memory (i.e., RAM) provides the benefit of fast program execution but has a disadvantage in that the large on-chip RAM requires an initial program loading operation from an off-chip non-volatile memory (i.e., Flash ROM) which has the program content stored therein. The use of such a non-volatile memory may add additional costs to the overall system design which utilizes the integrated circuit, in part because the integrated circuit packages and corresponding pin counts may be quite large. For instance, the interface between the external Flash ROM and the integrated circuit may include a parallel interface having 30 or more pins, which increases the complexity, size, and cost of use of such a system. While the cost and size of such an arrangement may be acceptable in the design of large, complex systems, such as a system that uses multiple chips and large program memories, the cost and size of such an arrangement may be unacceptable if the integrated circuit is to be used in a simple, low-cost system—such as in the design of a smaller microprocessor embedded system.

Alternatively, a large amount of non-volatile memory incorporated on-chip with the integrated circuit has the advantage of relatively low costs when compared with an arrangement that uses on-chip RAM/external Flash ROM. However, such an arrangement has the disadvantage of relatively slower program execution when compared with on-chip RAM/external Flash ROM, which may be unacceptable for use in a large, complex system.

Hence, in order to accommodate the needs of large, complex systems as well as small, low-cost systems, different integrated circuits are designed, manufactured, packaged and sold. As recognized by the present inventor, what is needed is an architecture for an integrated circuit die that may be utilized with large, complex systems using external memory or with small, low-cost systems.

It is against this background that various embodiments of the present invention were developed.

SUMMARY

According to one broad aspect of one embodiment of the present invention, disclosed herein is an integrated circuit device including a microprocessor, a multipurpose memory coupled with the microprocessor, a cache controller, and a first and second memory port. In one example, the first memory port is provided for coupling a first external memory device with the cache controller, and the second memory port is provided for coupling a second external memory device with the multipurpose memory. In one example, the first memory port may be adapted to be coupled with a Flash ROM, and the second memory port may be adapted to be coupled with an EEPROM. In this manner, the integrated circuit device may be utilized in different systems that have differing memory requirements.

In another embodiment, the multipurpose memory has a first operating mode for dynamically storing portions of a program obtained from the first external memory device, such as for execution by the microprocessor under control of the cache controller. In another example, the cache controller may be disabled, and the multipurpose memory has a second operating mode for storing an entire program obtained from the second external memory device to be run by the microprocessor. A serial peripheral interface may be provided between the second memory port and the EEPROM.

According to another broad aspect of an embodiment of the invention, disclosed herein is a system including a first external memory device and an integrated circuit. The integrated circuit includes a microprocessor, a multipurpose memory coupled with the microprocessor, a cache controller, and first and second memory ports. The first memory port is provided for coupling the first external memory device with the cache controller, and the second memory port is provided for coupling a second external memory device with the multipurpose memory. In this embodiment, the first memory device may include a Flash ROM which contains a program for execution by the microprocessor. Alternatively, the system could include a second external memory device and the integrated circuit, wherein the second external memory device is an EEPROM. Due to the architecture of the integrated circuit, a system designer would have the choice of whether to configure the system using the integrated circuit coupled with the first external memory device, or the integrated circuit coupled with the second external memory device.

According to another broad aspect of an embodiment of the invention, disclosed herein is a method for forming an integrated circuit on a die. The method includes providing a microprocessor on the die, providing a multipurpose memory on the die, providing a cache controller on the die, and providing a first and second memory port on the die. In one example, the first memory port is provided for coupling the cache controller with a first external memory device, such as a Flash ROM, and the second memory port is provided for coupling the multipurpose memory with a second external memory device, such as an EEPROM. A package may be provided for the integrated circuit such that, in one example, the first memory port of the die is coupled with a portion of the conductors of the package so that the first memory port may be connected with the first external memory device. Alternatively, the second memory port of the die may be coupled with a portion of the conductors of the package so that the second memory port may be connected with the second external memory device. In this manner, the integrated circuit may be used with different packages in different systems having differing memory requirements.

The foregoing and other features, utilities and advantages of the invention will be apparent from the following more particular description of various embodiments of the invention as illustrated in the accompanying drawings and claims.

DESCRIPTION OF THE DRAWINGS

FIG. 4A illustrates a block diagram of the integrated circuit die of FIG. 1 coupled with an external memory (EEPROM) during an initialization phase, in accordance with one embodiment of the present invention.

FIG. 4B illustrates a block diagram of the integrated circuit die of FIG. 1 coupled during normal operation, in accordance with one embodiment of the present invention.

DETAILED DESCRIPTION

Disclosed herein in one embodiment is an integrated circuit device, and associated system and method, which may be used with different packages so that the integrated circuit may be utilized with large, complex systems using external memory, or with small, low-cost systems. In one example, an integrated circuit device, such as an integrated circuit die, includes a multi-purpose memory which is configurable to operate in different modes depending upon the implementation or system in which the integrated circuit is used. In this manner, an integrated circuit die design may be manufactured and utilized with different systems having differing memory and performance requirements. Various embodiments of the present invention will now be described.

Figure 1:
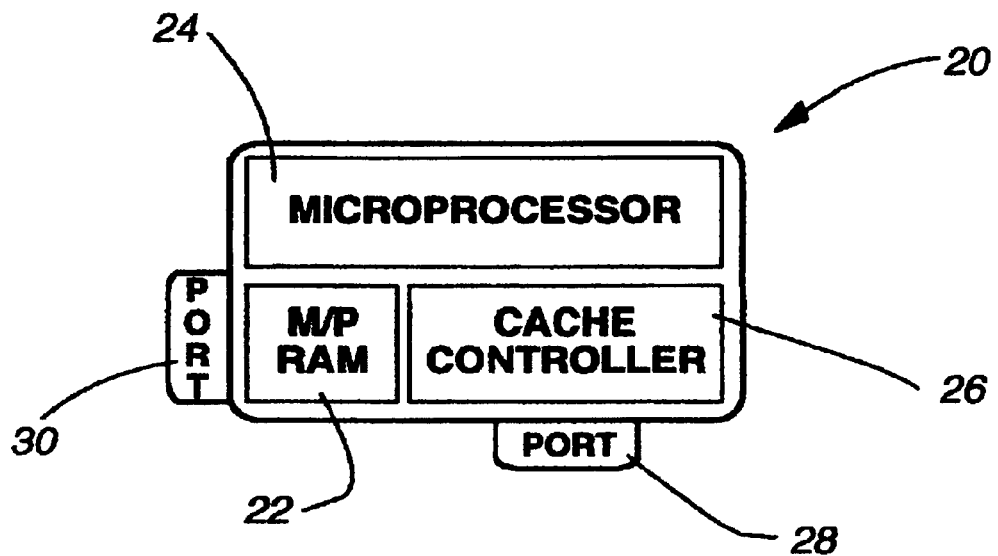
FIG. 1 illustrates a block diagram of an integrated circuit die having a multi-purpose memory, in accordance with one embodiment of the present invention.

Referring to FIG. 1, an integrated circuit die 20 has a multi-purpose memory 22 which is on-chip with a microprocessor 24 and cache controller 26, in accordance with one embodiment of the present invention. The multi-purpose memory 22 can be selected to operate in at least two different modes, the particular mode selected dependant upon the final environment or system in which the die 20 will be used. In one example, the integrated circuit die 20 has a first memory port 28 which provides an interface to the cache controller 26, and a second memory port 30 which provides an interface to the multi-purpose memory 22. In order to use the same die in different system designs, the packaging of the die 20 may be varied, as will be discussed below.

Generally, in a first mode, the integrated circuit die 20 may be utilized with an external non-volatile memory 40 (FIG. 2), such as Flash ROM, coupled with the first memory port 28 wherein the multi-purpose memory 22 acts as a cache memory, as shown and described with reference to FIGS. 2–3. Such an implementation may be useful in complex system design where one or more microprocessors are used with a large external system memory, such as Flash ROM. In a second mode, the integrated circuit die 20 may be used with an external memory 50 (FIG. 4A-B), such as a serial EEPROM, coupled with the second memory port 30 wherein the program instructions and/or other persistent information stored on the external memory 50 are loaded into the multi-purpose memory 22 during an initialization phase for execution, as shown and described with reference to FIGS. 4–5. Hence, the integrated circuit die 20 may be employed in different applications having differing memory architectures, depending upon the particular needs of the overall system in which the integrated circuit 20 will be used.

As shown in FIG. 1, the integrated circuit die 20 may also have a microprocessor 24 and a cache controller 26. The microprocessor 24, which may be a microcontroller or programmable logic, may include a central processing unit and related circuits and logic for implementing various computational functions, and may support a RISC (reduced instruction set computer) or CISC (complex instruction set computer) instruction set.

Figure 2:
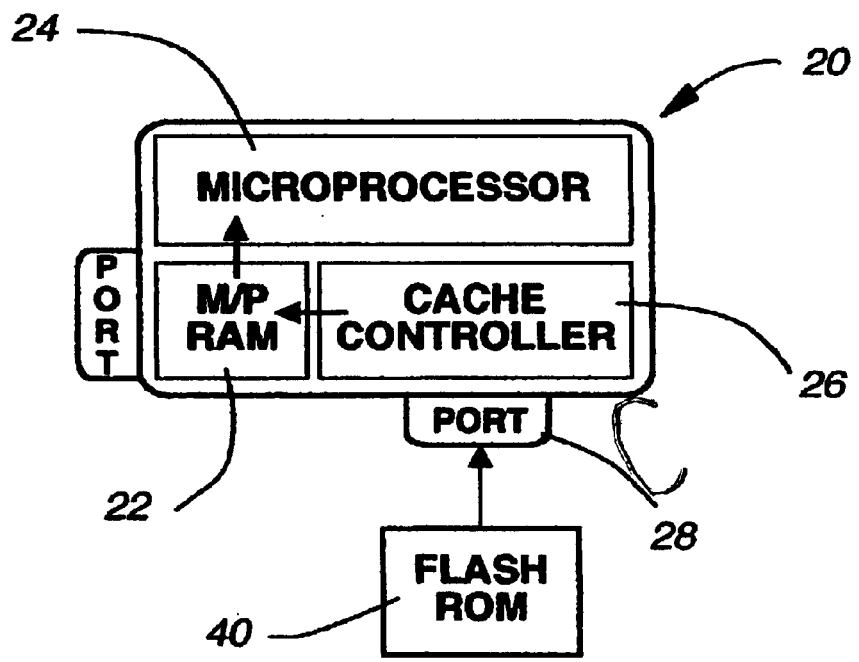
FIG. 2 illustrates a block diagram of the integrated circuit die of FIG. 1 coupled with an external memory (Flash ROM), in accordance with one embodiment of the present invention.
Figure 3:
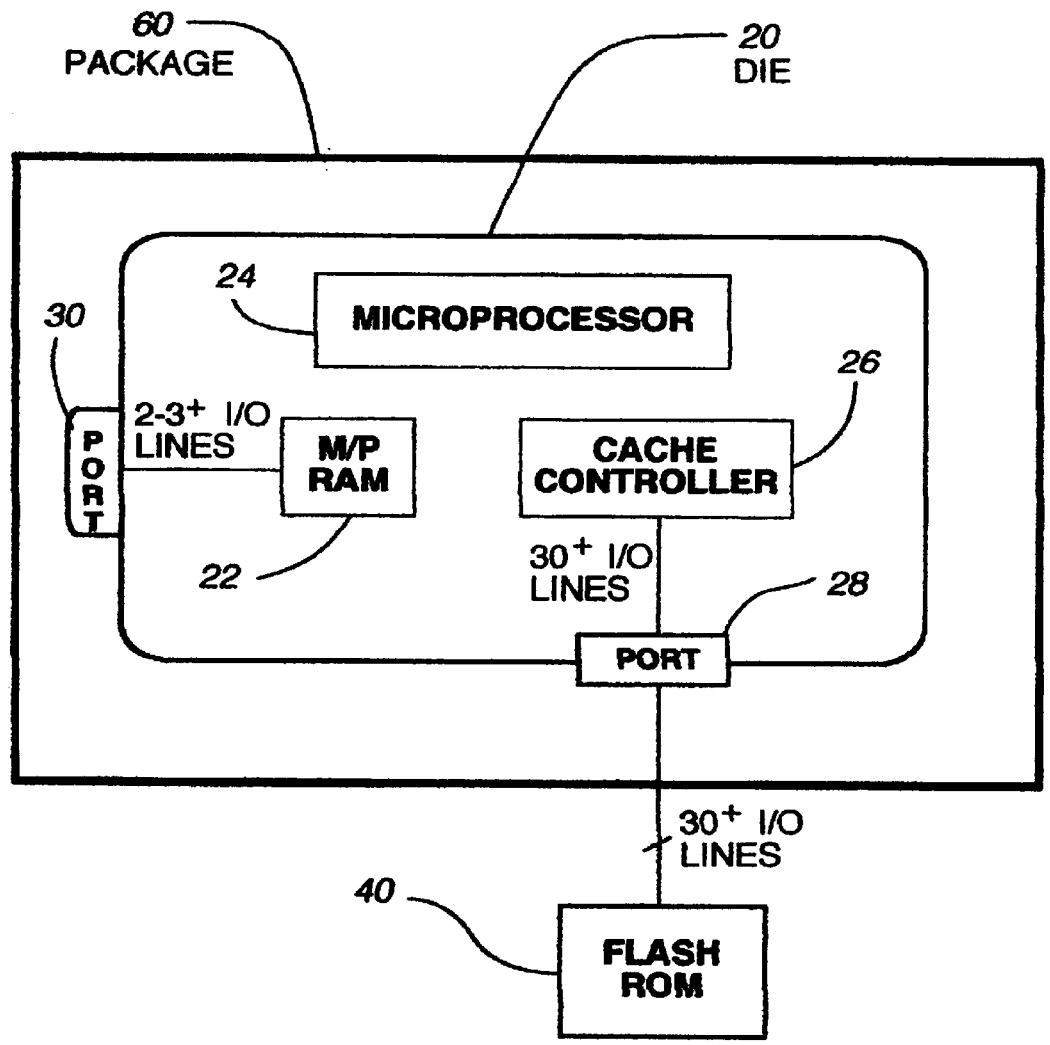
FIG. 3 illustrates a block diagram of the integrated circuit die of FIG. 2 coupled through a package with an external memory, in accordance with one embodiment of the present invention.

The cache controller 26 of the integrated circuit die 20 of FIG. 1, when enabled as in the first mode shown in FIGS. 2–3, provides instructions and/or data from an external memory 40 (i.e., the Flash ROM) to the multi-purpose memory 22 of the die 20. The microprocessor 24 then executes instructions from the on-chip multi-purpose memory 22, which speeds execution and improves overall performance. The cache controller 26 may include conventional algorithms for controlling the flow of data into the multi-purpose memory 22, in order to reduce access to the program stored in the off chip memory 40 (i.e., Flash ROM) and improve execution performance using the on-chip multi-purpose memory 22.

Referring to FIGS. 2–3, a first environment is illustrated in which the integrated circuit die 20 of FIG. 1 may be used. In this embodiment, the integrated circuit die 20 is coupled through the first memory port 28 with one or more non-volatile external memories devices 40, such as a Flash ROM, which are provided for persistent storage of the program to be executed by the microprocessor 24. The cache controller 26 functions as a normal cache and provides an interface to the external memory 40, so that the integrated circuit die 20 may be used in a system design wherein external program memory 40 is utilized, such as in a multi-chip system that uses large program memories.

In this example, the multi-purpose memory 22 acts as cache memory to the microprocessor 24 for accessing program instructions externally stored in the external memory 40. The external memory 40 may contain large programs, and the cache controller 26 loads a set of instructions (or portions of the program) into the multi-purpose memory 22 from the external memory 40. The microprocessor 24 executes these instructions from the multi-purpose memory 22, which provides a performance benefit of rapid availability of instructions for execution. If an instruction to be executed is not in the multi-purpose memory 22, then the external memory 40 is accessed through the cache controller 26 so that the needed instructions are loaded into the multi-purpose memory 22. In this sense, the contents of the multi-purpose memory 22 can change dynamically during operation under the control of the cache controller 26 as needed. As mentioned above, the cache controller 26 may implement or support one or more conventional cache management policies, depending on the particular performance needs of the system in which the integrated circuit die 20 is being used.

In order to provide the connections between the integrated circuit die 20 and the external memory system 40 for operating in the first mode, the first memory port 28 may include numerous I/O pins (i.e., 30 pins) for address and data between the external memory 40 and the die 20/package 60. In one example, the second memory port 30 is unused in this configuration, as shown in FIG. 3. The configurations of FIGS. 2–3 may be generally suited for embedded microprocessor systems where the memory requirements are relatively large.

Figure 5:
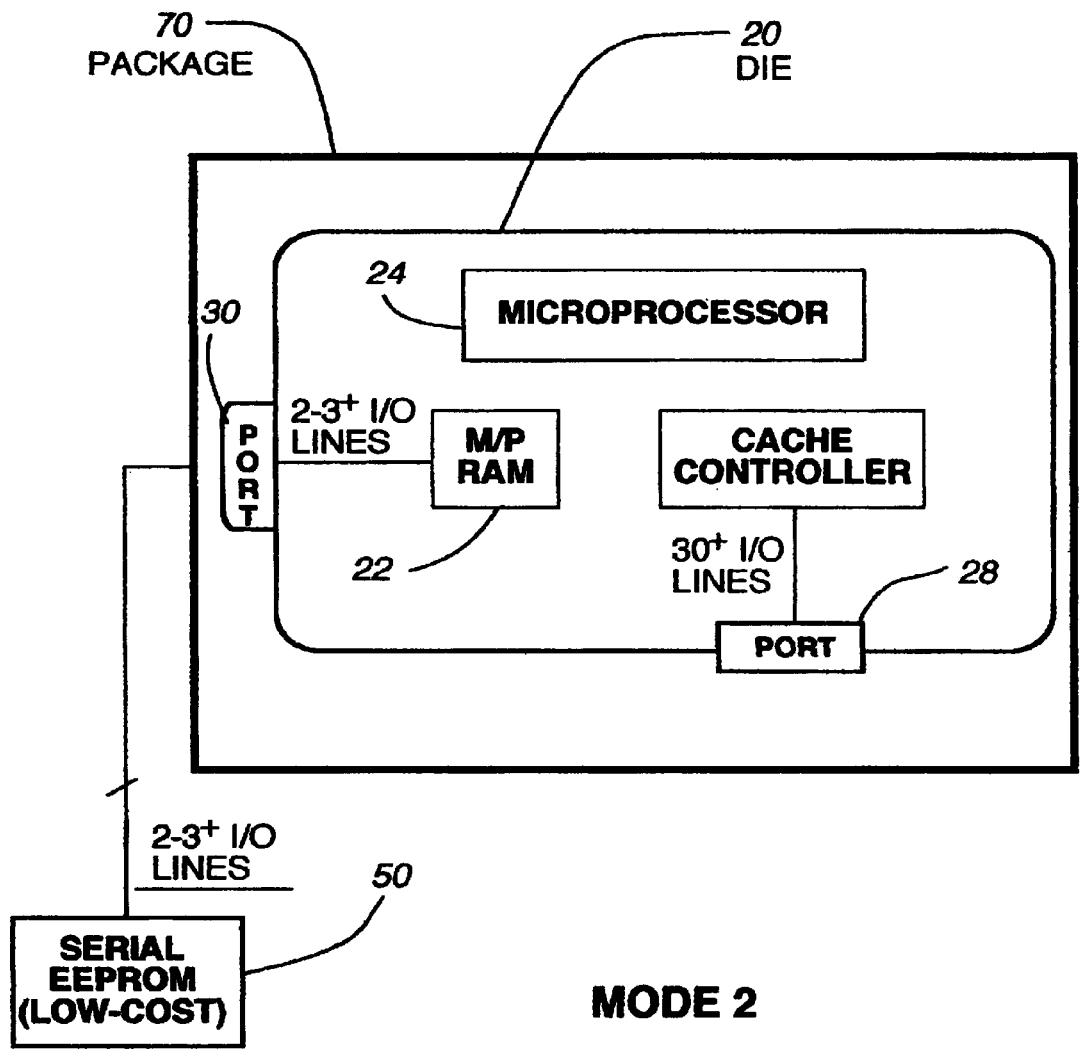
FIG. 5 illustrates a block diagram of the integrated circuit die of FIG. 4A coupled through a package with an external memory (EEPROM), in accordance with one embodiment of the present invention.

Referring to FIGS. 4–5, a second environment is illustrated in which the integrated circuit die 20 of FIG. 1 may be used. In this embodiment, the integrated circuit die 20 is coupled through the second memory port 30 with one or more non-volatile external memories devices 50, such as a low-cost serial EEPROM, which is provided for persistent storage of the program to be executed or data to be used by the microprocessor 24. The serial EEPROM 50 may be, in one example, an 8 pin device which may be significantly less expensive and smaller than a Flash ROM memory device 40 of FIGS. 2–3.

In this embodiment (shown as a second mode in FIGS. 4A–B, 5), the multipurpose memory 22 acts as a pre-loadable, non-cached program memory for the microprocessor 24, in one example. In this embodiment, the cache controller 26 is preferably disabled. As shown in FIG. 4A, the multi-purpose memory 22 is loaded during an initialization phase of the microprocessor 24 with the entire program to be run by the microprocessor 24. The external memory 50 may contain the entire program to be loaded into multi-purpose memory 22 and run by the microprocessor 24. A boot loader may be provided with the second memory interface 30 to pre-load the multi-purpose memory 22 with a program, and after the boot operation is complete, the multi-purpose memory 22 functions as an internal program memory on-chip, in one example.

Once the program is loaded into multi-purpose memory 22, then in one example the multi-purpose memory 22 is locked so that the program contents of the multi-purpose memory 22 cannot change, and as shown in FIG. 4B, the microprocessor 24 accesses, preferably directly, the multi-purpose memory 22 to obtain program instructions to execute. In one example, the program contents of the multi-purpose memory 22 are static and do not change dynamically during normal operations.

In order to provide the connections between the integrated circuit die 20 and the external memory 50 (i.e., EEPROM) for operating in the second mode, the second memory port 30 may include a plurality of I/O pins (i.e., 3 or 4 pins) to form a bus between the external memory 50 and the die 20/package 70. An example of the interface of the second memory port 30 between the multi-purpose memory 22 and an EEPROM 50 may include an serial peripheral interface (SPI), such as commercially available from Atmel, Microchip, and/or ST Microelectronics. Such an SPI interface utilizes, for example, 3 or 4 pins which permits the integrated circuit die 20 to be utilized in an overall low cost design. In one example, the integrated circuit package 70 may include 56 pins, in which a 3 wire SPI interface is made available as a portion of the package 70.

In one example, the first memory port 28 is unused in this configuration, as shown in FIG. 5, and the I/O pins of the first memory port 28 would preferably not be brought out from the die to the package. The configurations of FIGS. 4–5 may be generally suited for embedded microprocessor systems where the memory requirements are relatively small when compared with the configuration of FIGS. 2–3, or in a single processor system design.

Figure 6:
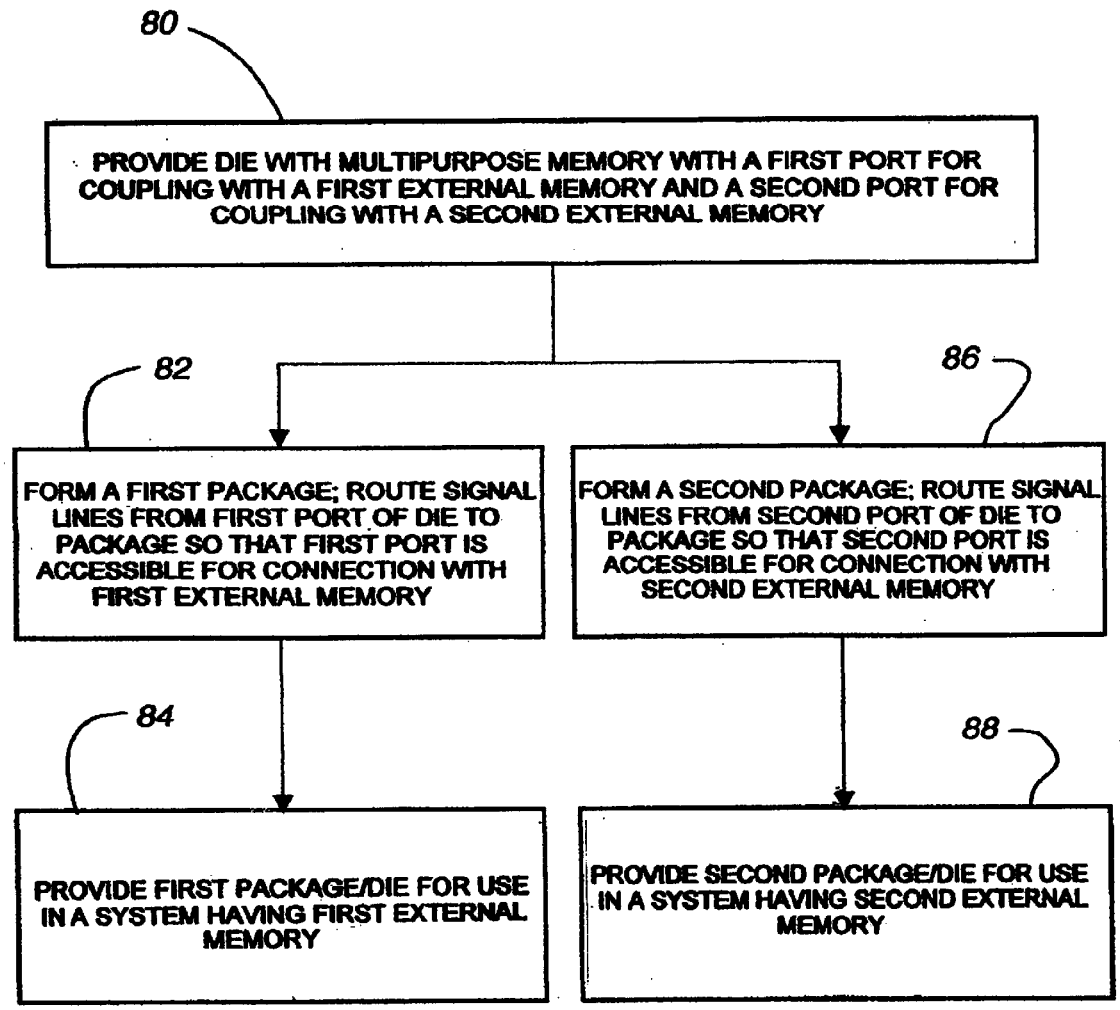
FIG. 6 illustrates an example of logical operations for forming and using an integrated circuit die, in accordance with one embodiment of the present invention.

FIG. 6 illustrates an example of logical operations for forming and using an integrated circuit die, in accordance with one embodiment of the present invention. The operations of FIG. 6 can be used to provide an integrated die which may be used in either a first system design or a second system design depending on the respective memory requirements thereof.

At operation 80, an integrated circuit die is provided with a multi-purpose memory, such as the multi-purpose memory 22 of FIG. 1, having a first port for coupling with a first external memory and a second port for coupling with a second external memory. In one embodiment, the first port provided by operation 80 is adapted for coupling a first external memory, such as a Flash ROM, with the multi-purpose memory using a cache controller, such as the cache controller 26 shown in FIG. 1. Further, in one example, the second port provided by operation 80 may be adapted for coupling a second external memory, such as a serial EEPROM, with the multi-purpose memory. In this manner, operation 80 provides an integrated circuit die which may be utilized with either the first external memory or the second external memory, in one example.

Operations 82–84 and 86–88 relate to utilizing the integrated circuit die formed by operation 80 in at least two different settings. The integrated circuit die may be utilized with a first package which provides access to the first port of the die for connection with a first external memory (operation 82–84); or the integrated circuit die may be used with a second package which provides access to the second port of the die for connection with a second external memory (operations 86–88).

At operation 82, a first package is formed for encasing the integrated circuit die of operation 80. The package may have a plurality of conductors thereon. The signal lines from the first port of the die are routed to a portion of the conductors of the package so that the first port is accessible for connection with the first external memory. In one example, the signal lines from the second port of the integrated circuit die are not routed to the first package, as the first package is not to be used with the second memory port. At operation 84, the first package and die are provided for use in a system having a first external memory. Because operation 82 provided the signal lines from the first port of the die to the conductors of package, the first external memory may be coupled with the appropriate signal lines of the first package so as to couple the first external memory with the first memory port.

If the die is to be used in a system having different memory requirements than described with reference to operations 82–84 (i.e., lower costs or smaller), then operations 86–88 may be used to provide the integrated circuit in combination with a second package. In one example, a portion of the conductors of the second package devoted to the second memory port is smaller than the portion of conductors of the first package devoted to the first memory port, so that the overall size of the second package may be smaller than the first package. At operation 86, the second package is formed for the housing and encasing the integrated circuit die. The signal lines from the second port of the die are routed to a portion of the conductors of the package so that the second memory port is accessible for connection with an external memory device, such as a serial EEPROM. At operation 86, the second package and die are provide for use in a system having an external memory such as the second external memory described with reference to FIGS. 4A–B, 5.

While the operations of FIG. 6 have been described with reference to a first and second package, it is understood that the integrated circuit die provided by operation 80 may be used in a package which routes signal lines from both the first and second ports of the die to the package so that both the first and second ports of the die are accessible for connection with the first or second external memory. In one embodiment, the multi-purpose memory may be configured so that the integrated circuit die utilizes either the first external memory over the first port, or the second external memory over the second port, but preferably not both. In this example, a system designer utilizing the integrated circuit die for a particular system design would connect either a first external memory through the first memory port, or a second external memory through the second memory port.

Accordingly, it can be seen that embodiments of the present invention provide an integrated circuit die with a multi-purpose memory architecture so that the same die can be used in different system designs having differing memory requirements, such as complex designs utilizing large external memories, or simple, inexpensive designs.

While the first and second external memory devices have been described and shown as Flash ROMs and Serial EEPROMs respectively, it is understood that other types of external memory devices may be used as the first and second external memory devices. Additionally, while the first and second memory ports have been shown and described as having 30 or more lines and 2–3 lines respectively, it is understood that the first and second memory ports may have a number of signal lines which may be more or less than the number of signal lines shown and described herein.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to a preferred embodiment thereof, it will be understood by those skilled in the art that various other changes in the form and details may be made without departing from the spirit and scope of the invention.

I claim:

1. An integrated circuit device, comprising:
    a microprocessor;
    a multipurpose memory coupled with the microprocessor;
    a cache controller;
    a first memory port for coupling a first external memory device with said cache controller; and
    a second memory port for coupling a second external memory device with said multipurpose memory;
    wherein the multipurpose memory has a first operating mode for dynamically storing as a cache memory portions of a program obtained from the first external memory device for execution by the microprocessor under control of the cache controller, and the multipurpose memory has a second operating mode for storing an entire program obtained from the second external memory device to be run by the microprocessor.

2. The device of claim 1, wherein the first memory port is adapted to be coupled with a Flash ROM as the first external memory device.

3. The device of claim 1, wherein the second memory port is adapted to be coupled with an EEPROM as the second external memory device.

4. The device of claim 1, further comprising:
    a serial peripheral interface between said second memory port and said second external memory device.

5. The device of claim 1, wherein when said first memory port is coupled with said first external memory device, said second memory port is not coupled with the second external memory device.

6. An integrated circuit device, comprising:
    a microprocessor;
    a multipurpose memory coupled with the microprocessor;
    a cache controller;
    a first memory port for coupling a first external memory device with said cache controller; and
    a second memory port for coupling a second external memory device with said multipurpose memory;
    wherein the multipurpose memory has a first operating mode for dynamically storing as a cache memory portions of a program obtained from the first external memory device for execution by the microprocessor under control of the cache controller, and the multipurpose memory has a second operating mode for storing an entire program obtained from the second external memory device to be run by the microprocessor; and
    wherein the cache controller is disabled when the second memory port is coupled with the second external memory device.

7. A method for forming an integrated circuit on a die, comprising:
    providing a microprocessor on the die;
    providing a multipurpose memory on the die;
    providing a cache controller on the die;
    providing a first memory port for coupling the cache controller with a first external memory device;
    providing a second memory port for coupling the multipurpose memory with a second external memory device;
    providing the multipurpose memory with a first operating mode for dynamically storing portions of a program obtained from the first external memory device for execution by the microprocessor under control of the cache controller; and
    providing the multipurpose memory with a second operating mode for storing an entire program obtained from a second external memory device to be run by the microprocessor.

8. The method of claim 7, wherein the operation of providing a first memory port for coupling the cache controller with a first external memory device further comprises:
    adapting the first memory port to be coupled with a Flash ROM as the first external memory device.

9. The method of claim 7, wherein the operation of providing a second memory port for coupling the cache controller with a second external memory device further comprises:
    adapting the second memory port to be coupled with a serial EEPROM as the second external memory device.

10. The method of claim 7, further comprising:
    providing a package for the integrated circuit, the package having a plurality of conductors; and
    coupling the first memory port of the die with a portion of the conductors of the package so that the first memory port may be connected with the first external memory device.

11. The method of claim 7, further comprising:

providing a package for the integrated circuit, the package having a plurality of conductors; and coupling the second memory port of the die with a portion of the conductors of the package so that the second memory port may be connected with the second external memory device.

12. The method of claim 7, further comprising:

providing the multipurpose memory with a first operating mode for dynamically storing portions of a program obtained from the first external memory device for execution by the microprocessor under control of the cache controller.

13. A system, comprising:

an external memory device; and an integrated circuit including:
- a microprocessor;
- a multipurpose memory coupled with the microprocessor;
- a cache controller coupled with the multipurpose memory;
- a first memory port for coupling the external memory device with said cache controller; and
- a second memory port for coupling a second external memory device with said multipurpose memory, wherein said first and second memory ports are not simultaneously active to pass data to said multipurpose memory wherein the multipurpose memory has a first operating mode for dynamically storing portions of a program obtained from the external memory device for execution by the microprocessor under control of the cache controller, and the multipurpose memory has a second operating mode for storing an entire program obtained from the second external memory device to be run by the microprocessor.

14. The system of claim 13, wherein the external memory device is a Flash ROM.

15. The system of claim 14, wherein the second memory port is adapted to be coupled with an EEPROM as the second external memory device.

16. The system of claim 13, wherein the multipurpose memory has a first operating mode for dynamically storing portions of a program obtained from the external memory device for execution by the microprocessor under control of the cache controller.

17. The system of claim 13, wherein the second memory port is a serial peripheral interface.

\* \* \* \* \*